United States Patent [19]

Nelson

[11] Patent Number: 4,767,810

[45] Date of Patent: Aug. 30, 1988

[54] BLENDS OF COPOLYESTER-CARBONATE AND POLYESTER RESINS EXHIBITING IMPROVED COLOR PROPERTIES

[75] Inventor: Linda H. Nelson, Evansville, Ind.

[73] Assignee: General Electric Company, Mt. Vernon, Ind.

[21] Appl. No.: 944,033

[22] Filed: Dec. 22, 1986

[51] Int. Cl.$^4$ .............................................. C08L 67/02
[52] U.S. Cl. ...................................... 524/56; 524/58; 524/386; 524/387; 525/439
[58] Field of Search ................... 524/56, 58, 386, 387; 525/439

[56] References Cited

U.S. PATENT DOCUMENTS

| | | | |
|---|---|---|---|
| 3,560,605 | 2/1971 | Siggel | 525/438 |
| 4,226,961 | 10/1980 | Motz | 525/439 |
| 4,258,153 | 3/1981 | Yomamoto | 525/397 |
| 4,366,273 | 12/1982 | Aharoni | 523/400 |
| 4,369,303 | 1/1983 | Mori | 528/173 |
| 4,414,230 | 11/1983 | Hanabata | 525/439 |

Primary Examiner—Patricia Short
Attorney, Agent, or Firm—Martin B. Barancik

[57] ABSTRACT

A resinous composition comprising:
(i) at least one copolyester-carbonate resin;
(ii) at least one polyester resin; and
(iii) a minor amount of at least one polyol.

35 Claims, No Drawings

BLENDS OF COPOLYESTER-CARBONATE AND POLYESTER RESINS EXHIBITING IMPROVED COLOR PROPERTIES

BACKGROUND OF THE INVENTION

Blends of copolyester-carbonate and polyester resins are known in the art. These blends exhibit excellent properties which render them useful for making films, fibers, and molded articles. They exhibit, for example, better ductility than neat polyesters and better processability than neat copolyester-carbonates. Some of these blends, however, have a tendency to discolor or yellow. It would be very advantageous if the blends of copolyester-carbonates and polyesters which tend to yellow could be provided which possessed improved color properties, i.e., reduced yellowing.

It has now been discovered that yellowing in copolyester-carbonate/polyester blends which normally tend to yellow can be reduced by incorporating in said blends minor amounts of a polyol compound.

SUMMARY OF THE INVENTION

The instant invention is directed to resinous compositions comprising a major portion of at least one copolyester-carbonate resin and a polyester resin and a minor portion of at least one polyol. The polyol acts as a color stabilizer in those blends that tend to discolor and is present, in those blends, in an antiyellowing effective amount.

DESCRIPTION OF THE INVENTION

It has been discovered that color formation such as yellowing in blends of aromatic copolyester-carbonate resins and polyester resins can be reduced or inhibited by incorporating in said blends or admixing therewith at least one polyol. These polyols act to inhibit or reduce yellowing in the copolyestercarbonate/polyester blends. That is to say these polyols, when admixed with the blends, function as color stabilizers or antiyellowing agents.

The polyols are added to or mixed with the blends of copolyestercarbonate and polyester resins in relatively small amounts. These color stabilized copolyestercarbonate/polyester blends exhibit better color properties, i.e., reduced yellowing, than comparable blends which do not contain any of the polyol color stabilizer.

This reduction of yellowing by the polyol color stabilizer is exhibited in blends containing a wide ratio of copolyestercarbonate to polyester resin. It is also exhibited with a wide range of different copolyestercarbonate and polyester resins.

The copolyestercarbonate resins utilized in the instant invention are well known thermoplastic resins which are described, along with methods for their preparation, inter alia, in U.S. Pat. Nos. 3,169,121; 4,238,597; 4,156,069; 4,238,597 and 3,559,388, all of which are incorporated herein by reference.

Briefly stated the high molecular weight thermoplastic aromatic copolyester-carbonate resins comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocylic groups.

The copolyester-carbonates contain ester bonds and carbonate bonds in the polymer chain, wherein the amount of ester bonds is in the range of from about 25 to about 90 mole percent, preferably from about 35 to about 80 mole percent. For example, 5 moles of bisphenol-A reacting completely with 4 moles of isophthaloyl dichloride and 1 mole of phosgene would yield a copolyester-carbonate of 80 mole percent ester bonds.

The copolyester-carbonates may be prepared by a variety of methods including melt polymerization, transesterification, and the interfacial polymerization process.

These copolyester-carbonates may conveniently be prepared by the interfacial polymerization process by the reaction of (i) at least one dihydric phenol, (ii) a carbonate precursor, and (iii) at least one ester precursor.

The dihydric phenols utilized may typically be represented by the formula

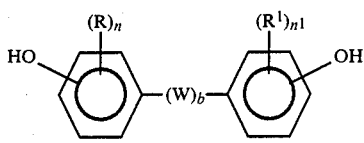

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
W is selected from divalent hydrocarbon radicals,

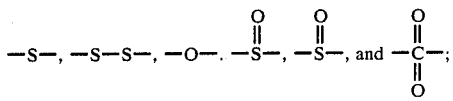

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl, and alkaryl radicals. The perferred alkyl radicals are the $C_1$-$C_{12}$ alkyls. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms. The preferred halogen radicals represented by R and $R^1$ are chlorine and bromine.

The monovalent hydrocarbonoxy radicals represented by R and $R^1$ may be represented by the formula $$-OR'$$  II.

wherein R' is a monovalent hydrocarbon radical of the type described for R and $R^1$ hereinafore. The preferred monovalent hydrocarbonoxy radicals are the alkoxy radicals and the aryloxy radicals.

The divalent hydrocarbon radicals represented by W in Formula I include the alkylene radicals, the alkylidene radicals, the cycloalkylene radicals, and the cycloalkylidene radicals. The preferred alkylene radicals are those containing from 2 to about 30 carbon atoms. These alkylene radicals may be straight chain alkylene radicals or branched alkylene radicals. The preferred alkylidene radicals are those containing from 1 to about 30 carbon atoms. These alkylidene radicals may be staright chain alkylidene radicals or branched alkylidene radicals.

The preferred cycloalkylene radicals are those containing from 6 to about 16 ring carbon atoms. The preferred cycoalkylidene radicals are those containing from 6 to about 16 ring carbon atoms. The cycloalkylene radicals may contain substituent groups, such as alkyl groups, on the ring. Preferred alkyl groups are those containing from 1 to about 5 carbon atoms. The cycloalkylidene radicals may likewise contain substituent groups, such as alkyl groups, on the ring. These alkyl groups likewise preferably contain from 1 to about 4 carbon atoms Some illustrative non-limiting examples of dihydric phenols of Formula I inlcude:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-thiodiphenol; and
bis(4-hydroxyphenyl)ether.

Other useful dihydric phenols are described in U.S. Pat. Nos. 2,998,835; 3,028,365 and 3,334,154, all of which are incorporated herein by reference.

The carbonate precursor may be a carbonyl halide; a carbonate ester; or a bishaloformate. The carbonyl halides may be carbonyl bromide, carbonyl chloride, or mixtures thereof. The carbonate esters may be diphenyl carbonate; di(halophenyl)carbonates such as di(bromophenyl)carbonate, di(chlorophenyl)carbonate, and di(tribromophenyl) carbonate; di(alkylphenyl)carbonates such as di(tolyl)carbonate; di(naphthyl)carbonate; chlorophenyl chloronaphthyl carbonate; and phenyl tolyl carbonate. The bishaloformates include the bishaloformates of dihydric phenols such as the bischloroformates of bisphenol-A and hydroquinone; and the bishaloformates of glycols such as the bischloroformates of ethylene glcyol, neopentyl glycol, and polyethylene glycol. The preferred carbonate precursor is carbonyl chloride, also known as phosgene.

The ester precursor may be a difunctional carboxylic acid or, preferably, the ester forming reactive derivative of the difunctional carboxylic acid. In general, any of the difunctional carboxylic acids, such as the dicarboxylic acids, and preferably any ester forming reactive derivative thereof, conventionally used in the preparation of linear polyesters may be utilized in the preparation of the instant copolyester-carbonates. In general the difunctional carboxylic acids, preferably their ester forming reactive derivatives, include the aliphatic dicarboxylic acids, the aromatic dicarboxylic acids, and the aliphatic-aromatic dicarboxylic acids, and their ester forming reactive derivatives. Some useful difunctional carboxylic acids are disclosed in U.S. Pat. No. 3,169,121, which is hereby incorporated herein by reference.

Particularly useful difunctional carboxylic acids, preferably their ester forming reactive derivatives, are the aromatic dicarboxylic acids.

The preferred ester forming reactive derivatives of the aromatic dicarboxylic acids are the diacid halides, preferably the diacid chlorides. Some illustrative non-limiting examples of these derivatives are isophthaloyl dichloride, terephthaloyl dichloride, and mixtures thereof. A particularly useful mixture of the ester forming reactive derivatives of isophthalic acid and terephthalic acid is one which contains a weight ratio of isophthaloyl dichloride to terephthaloyl dichloride of from about 1:10 to about 9.8:0.2.

Particularly useful copolyester-carbonates are those containing from about 70 to about 80 mole percent ester content, said ester content being comprised of from from about 1 to about 10 mole % terephthalate and from about 90 to about 99 mole percent isophthalate.

A convenient process for the preparation of the copolyester-carbonate resins is the interfacial polymerization process. This process utilizes two different solvent media which are immiscible. One solvent medium is an aqueous basic medium while the other medium is an organic medium such as methylene chloride. Also employed in this process are molecular weight regulators which control the chain length or molecular weight of the polymer by a chain terminating mechanism, and catalysts. The molecular weight regulators are well known in the art and include, but are not limited to, phenol itself, p-tertiarybutyl phenol, and chroman-I. The catalysts are also well known in the art and include, but are not limited to, tertiary amines such as triethylamine, quaternary ammonium compounds such as tetraethyl ammonium broimde, and quaternary phosphonium compounds such as n-butyl triphenyl phosphonium.

Also included within the term copolyestercarbonates are the randomly branched thermoplastic copolyestercarbonates, wherein a branching agent, which is generally a polyfunctional aromatic compound, is reacted with the dihydric phenol, the carbonate precursor, and the ester precursor. These polyfunctional aromatic compounds contain at least three functional groups which may be carboxyl, carboxylic anhydride, haloformyl, and mixtures thereof. Some illustrative non-limiting examples of these aromatic polyfunctional compounds include trimellitic anhydride, trimellitic acid, trimellityl trichloride, 4-chloroformyl phthalic anhydride, pyromellitic acid, pyromellitic dianhydride, mellitic acid, trimesic acid, and benzophenonetetracarboxylic acid.

The polyester resins are well known in the art and are amply described, along with methods for their preparation, in the literature. They are described, inter alia, in U.S. Pat. Nos. 2,485,319; 3,047,539; 3,317,464; 3,351,624: 3,498,950 and 4,066,627; and in Billmeyer, F. W., Jr., Textbook of Polymer Science, Interscience Publishers, New York, N.Y., 1962, pp. 434–436, 472–475 and 504–505. All of which are incorporated herein by reference.

The polyesters may generally be prepared by the reaction of a dicarboxylic acid with a glycol.

The polyesters may be either aliphatic, aromatic, or aliphatic-aromatic in character. The polyesters are characterized in that they have recurring ester units in the polymer chain, i.e., carboxylate groups bonded to a carbon atom of a hydrocarbon or substituted hydrocarbon radical.

The preferred polyesters for use in the instant invention generally contain at least one recurring structural unit represented by the general formula

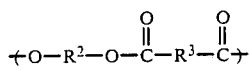
III.

wherein $R^2$ and $R^3$ are independently selected from divalent hydrocarbon radicals or substituted divalent hydrocarbon radicals.

In the case of aliphatic polyesters both $R^2$ and $R^3$ are independently selected from divalent aliphatic hydrocarbon radicals or substituted divalent aliphatic hydrocarbon radicals. The divalent aliphatic hydrocarbon radicals include the alkylene, alkenylene, alkylidene, cycloalkylene, cycloalkylidene, and cycloalkenylene radicals. Preferred alkylene radicals are those containing from 2 to about 20 carbon atoms. The preferred alkylidene radicals are those containing from 1 to about 20 carbon atoms. The preferred alkenylene radicals are those containing from 2 to about 20 carbon atoms. The preferred cycloalkylene, cycloalkylidene, and cycloalkenylene radicals are those containing from about 4 to about 8 ring carbon atoms. The substituted divalent aliphatic hydrocarbon radicals are those divalent aliphatic hydrocarbon radicals described above which contain at least one substituent group, preferably from one to about three substituent groups. The preferred substituent groups are the halogens, nitro groups, and amino groups.

The aromatic polyesters suitable for use in the instant invention generally contain at least one recurring structural unit of Formula III wherein $R^2$ and $R^3$ are independently selected from divalent aromatic radicals or substituted divalent aromatic radicals. The divalent aromatic radicals represented by $R^2$ and $R^3$ include the phenylene radical, the substituted phenylene radical, the biphenylene radical, the substituted biphenylene radical, the naphthylene radical, the substituted naphthylene radical, and radicals represented by the general formula

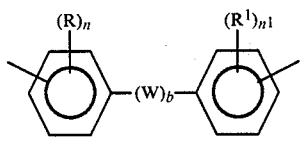
IIIa.

wherein R, $R^1$, W, n, $n^1$ and b are as defined hereinafore.

Particularly useful aromatic polyesters are those wherein $R^3$ is a phenylene radical and $R^2$ is a radical represented by Formula IIIa.

The aliphatic aromatic polyesters are those wherein one of $R^2$ or $R^3$ is a divalent aromatic radical and one of $R^2$ or $R^3$ is a divalent aliphatic radical. Preferred aliphatic aromatic polyesters are those wherein $R^2$ is a divalent aliphatic radical or substituted divalent aliphatic radical and $R^3$ is a divalent aromatic radical or a substituted divalent aromatic radical.

One class of particularly useful aliphatic aromatic polyesters are the polyalkylene terephthalates or polyalkylene isophthalates. These types of polyesters contain at least one recurring structural unit represented by the general formula

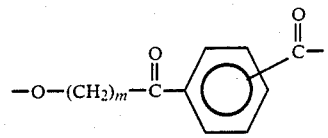
IIIb.

wherein m is a whole number having a value of from 2 to 4 inclusive. Especially preferred polyesters of Formula IIIb are polyethylene terephthalate and poly(1,4-butylene terephthalate).

Another class of particularly useful aliphatic aromatic polyesters are polyester copolymers or copolyesters which can, without limitation, comprise the reaction products of: (a) a glycol portion comprising a 1,4-cyclohexanedimethanol with an acid portion comprising terephthalic acid, isophthalic acid, or mixtures thereof; or (b) a glycol portion comprising a 1,4-cyclohexanedimethanol and ethylene glycol wherein the molar ratio of the 1,4-cyclohexanedimethanol to the ethylene glycol in the glycol portion is from about 4:1 to about 1:4, with an acid portion comprising terephthalic acid, isophthalic acid, or mixtures thereof.

These types of copolyesters may be prepared by procedures well known in the art, such as by condensation reactions substantially as shown and described in U.S. Pat. No. 2,901,466, which is hereby incorporated herein by reference. More particularly, the acid or mixtures of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product can be cooled, pulverized, and the powder heated to a temperature somewhat less than employed during the last stage of molten polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under greatly reduced pressure.

These copolyesters will generally have an intrinsic viscosity of at least about 0.4 dl/gm as measured in 60/40 phenol/tetrachloroethane or other similar solvents at about 25° C. and will have a heat distortion temperature from about 60° C. to about 70° C. The relative amounts of the 1,4-cyclohexane dimethanol to ethylene glycol in the glycol portion of the copolyester (b) may vary so long as the molar ratio of 1,4-cyclohexane dimethanol to ethylene glycol is from about 1:4 to about 4:1, in order to provide a polyester copolymer having suitable heat distortion temperatures within the recited range, and other suitable properties.

One quite useful type of copolyester is a copolyester of the type described hereinafore wherein the glycol portion has a predominance of ethylene glycol over 1,4-cyclohexane dimethanol, for example greater than 50/50 and especially preferably is about 70 molar ethylene glycol to 30 molar 1,4-cyclohexane dimethanol, and the acid portion is terephthalic acid. A preferred copolyester of this type is commercially available from Eastman Chemical Co. under the tradename KODAR PETG 6763. A preferred copolyester is one derived from 1,4-cyclohexane dimethanol as the glycol portion and a mixture of isophthalic and terephthalic acids as the acid portion. This type of copolyester is available from Eastman Chemical Co. under the tradename KODAR A150.

The ratios of the polyesters to the copolyestercarbonates in the instant blends may vary widely. Generally, compositions which contain from about 5 to about 95 weight % of copolyester-carbonate and from about 95 to about 5 weight % polyester are preferred, while compositions containing from about 20 to about 80 weight % copolyester-carbonate and from about 80 to about 20 weight % polyester are more preferred. Weight % copolyester-carbonate is based on the total amounts of copolyester-carbonate and polyester resins present in the compositions.

The polyols which are admixed with the copolyester-carbonate and polyester, and which function as color stabilizers in those blends exhibiting yellowing, are well known compounds which are amply described in the literature and are generally commercially available or may be prepared by known methods.

They may be represented by the general formula

       IV.

wherein:

$R^4$ is an aliphatic hydrocarbon moiety, a substituted aliphatic hydrocarbon moiety, an aliphaticaromatic hydrocarbon moiety, or a substituted aliphaticaromatic hydrocarbon moiety, preferably containing from 2 to about 20 carbon atoms, with the proviso that when $R^4$ is an aliphatic-aromatic or substituted aliphatic-aromatic hydrocarbon moiety the hydroxyl groups are bonded to the aliphatic portion of said moiety; and r is a positive integer having a value of from 2 up to the number of replaceable hydrogen atoms present on $R^4$, preferably from 2 to about 8.

The aliphatic hydrocarbon moieties represented by $R^4$ include the acyclic aliphatics and the cycloaliphatics. The acylic aliphatic moieties are preferably those containing from 2 to about 20 carbon atoms in either a straight or branched chain. The cyclic aliphatic moieties are preferably those containing from 4 to about 8 ring carbon atoms. These cyclic aliphatic moieties may contain alkyl substituent groups on the ring carbon atoms, and the hydroxyl groups may be bonded to either the ring carbon atoms or to the alkyl substituent groups, or to both.

The aliphatic-aromatic hydrocarbon moieties represented by $R^4$ are those containing an aromatic portion which preferably contains from 6 to 12 ring carbon atoms, i.e., phenyl, biphenyl, naphthyl, and an aliphatic portion bonded to the ring carbon atoms of the aromatic portion, with the hydroxyl groups being present only on the aliphatic portion. It is to be understood that only one aliphatic portion may be bonded to the aromatic portion, or two or more aliphatic portions may be bonded to the aromatic portion. If more than one aliphatic portion is bonded to the aromatic portion of the aliphaticaromatic moiety the hydroxyl groups may be present on different aliphatic portions.

The substituted aliphatic and substituted aliphatic-aromatic moieties represented by $R^4$ are those which contain substituent groups on the hydrocarbon moieties, preferably from 1 to about 4 substituent groups. The preferred substituent groups are the halogens, preferably chlorine and bromine, amino, and nitro groups. When more than one substituent group is present they may be the same or different.

Preferred polyols of Formula IV are the acylic aliphatic polyhydric alkanols, with the hexahydric alkanols being preferred. Preferred polyols of this type are those wherein the hydroxyl groups are bonded to different carbon atoms of the acyclic aliphatic hydrocarbon moiety.

Some illustrative non-limiting examples of polyols represented by Formula IV include cyclohexane dimethanol, butanediol, mannitol, sorbitol, 1,3-propanediol, glycerol, 1,2-cyclopentanediol, inositol, 1,3,4-cyclohexanetriol, 1,2,3,4,5-pentahydroxypentane, and 1,1,2,2-tetrahydroxyethane.

The amount of the polyol present in the instant compositions is a minor amount, based on the total amounts of copolyester-carbonate, polyester and polyol present, with the copolyester-carbonate and polyester being present as the major portions of the instant compositions. Generally, the amount of polyol present is from about 0.01 to about 5 weight percent, preferably from about 0.05 to about 2 weight percent. Weight percent of polyol is based on the total amounts of copolyester-carbonate, polyester, and polyol present in the instant compositions.

In those copolyester-carbonate/polyester compositions which exhibit yellowing the amount of polyol present is an antiyellowing effective amount. By antiyellowing effective amount is meant an amount effective to stabilize the color of the copolyestercarbonate/polyester compositions, i.e., an amount effective to inhibit or reduce yellowing of these blends. Generally, this amount is at least about 0.01 weight percent, preferably at least about 0.05 weight percent. Weight percent of color stabilizer is based on the total amounts of color stabilizer and copolyester-carbonate/polyester resin blend present in the composition. The upper limit of the amount of color stabilizer present is such that it is insufficient to substantially deleteriously affect, to a substantial degree, substantially most of the advantageous properties of the copolyester-carbonate/polyester blends. Generally, this amount should not exceed about 5 weight percent, preferably about 2 weight percent, and more preferably about 1 weight percent.

The compositions of the instant invention may be prepared by well known and conventional blending techniques, for example, by first preparing the blends of the copolyester-carbonate and the polyester resins and thereafter thoroughly mixing with said blends the desired amounts of said polyol.

It is to be understood that mixtures of two or more different polyols, as well as individual polyols, can be used as the color stabilizer.

The compositions of the instant invention may optionally contain the commonly known and used additives such as, for example: antioxidants; mold release agents; fillers such as glass, talc, mica, and clay; ultraviolet radiation stabilizers such as the benzophenones, benzotriazoles, and cyanoacrylates; conventional color stabilizers such as the organophosphites; and flame retardants. Some particularly useful flame retardants are the alkali and alkaline earth metal salts of organic sulfonic acids. These types of flame retardants are described, inter alia, in U.S. Pat. Nos. 3,933,734; 3,931,100; 3,978,024; 3,948,851; 3,926,908; 3,919,167; 3,909,490; 3,853,396; 3,853,399; 3,917,559; 3,951,910 and 3,940,366, all of which are incorporated herein by reference.

DESCRIPTION OF THE PREFERRED EMBODIMENT

The following examples are set forth to further illustrate the present invention and are not to be construed as limiting the invention thereto. Unless otherwise indicated, all parts and percentages in the examples are on a weight basis.

The following example illustrates a composition falling outside the scope of the present invention. It is presented for comparative purposes only.

EXAMPLE 1

A blend is prepared by admixing 50 parts by weight of a copolyester resin (KODAR A150) and 50 parts by weight of a copolyester-carbonate resin (having an ester content of 75 mole %, said ester being 93 mole % isophthalate and 7 mole percent terephthalate; and being derived from bisphenol-A, phosgene, isophthaloyl dichloride and terephthaloyl dichloride). This blend is admixed with 0.03 parts by weight per hundred parts by weight of resin blend of a conventional organophosphite color stabilizer. This mixture is extruded on a a Sterling single screw (1¾") extruder at a melt temperature of 570° F. Test plaques ⅛" in thickness are injection molded on a 3 oz. Van Dorn using a 570° F. melt temperature, a 180° F. mold cavity temperature, and a 10/20 cycle time. The Yellowness Index (YI) of the test plaques is measured on a Gardner Colorimeter in accordance with test method ASTM D1925. The results are set forth in Table I.

The following examples illustrate the compositions of the present invention.

EXAMPLE 2

The procedure of Example 1 is substantially repeated, except that to the mixture of Example 1 there is added 0.12 parts by weight per hundred parts by weight of resin blend of mannitol, The YI is determined and the results are set forth in Table I.

EXAMPLE 3

The procedure of Example 1 is substantially repeated, except that the 0.03 parts by weight per hundred parts by weight of resin of the organophoshite color stabilizer are replaced with 0.12 parts by weight per hundred parts by weight of resin of mannitol. The YI is determined and the results are set forth in Table I.

EXAMPLE 4

The procedure of Example 1 is substantially repeated, except that to the mixture of Example 1 there is added 0.12 parts by weight per hundred parts by weight of resin of inositol, The YI is determined and the results are set forth in Table I.

TABLE I

| Example No. | YI |
| --- | --- |
| 1 | 76.8 |
| 2 | 14.5 |
| 3 | 15.6 |
| 4 | 52.9 |

As illustrated by the data in Table I the compositions of the present invention (Examples 2-4) exhibit a lower YI, i.e., less yellowness, than the blends of copolyester-carbonate/polyester which do not contain any polyol (Example 1). The YI of a composition containing no conventional organophosphite color stabilizer (Example 3) is slightly more than one point higher than the YI of a composition containing both mannitol and the organophosphite color stabilizer (Example 2). Thus the presence or absence of the organophosphite color stabilizer is not too significant in affecting the YI of the compositions, particularly since the control (Example 1) also contains this organophosphite color stabilizer. This clearly illustrates that the polyols of the instant invention are quite effective in reducing the yellowing of copolyester-carbonate/polyester blends.

The compositions of the instant invention are useful in the production of extruded or injection molded parts exhibiting less yellowing.

The polyols of the instant invention can also be advantageously added to or admixed with those copolyester-carbonate/polyester resin blends where discoloration or yellowing is not a significant problem, since the polyols, besides reducing yellowing in those blends which tend to yellow, also inhibit or reduce transesterification in copolyester-carbonate/polyester resin blends which are subject to transesterification. In such cases these compositions contain from about 0.01 to about 5 weight percent polyol, preferably from about 0.05 to about 2 weight percent more preferably from about 0.1 to about 2 weight percent. Weight percent polyol is based on the total amounts of polyol and copolyester-carbonate/polyester resin blend present.

Obviously, other modifications and variations of the present invention are possible in light of the above teachings. It is, therefore, to be understood that changes may be made in the particular embodiments of the invention described which are within the full intended scope of the instan invention as defined by the appended claims.

What is claimed is:

1. A resinous composition consisting essentially of:
   (i) at least one aromatic copolyester-carbonate resin;
   (ii) at least one polyester resin; and
   (iii) from about 0.01 to about 5 weight percent, based on the total amounts of (i)–(iii) present of at least one polyol of the formula $$R^4-(OH)_r$$

wherein
   $R^4$ is selected from aliphatic hydrocarbon moieties, substituted aliphatic hydrocarbon moieties, aliphatic aromatic hydrocarbon moieties, or substituted aliphatic aromatic hydrocarbon moieties, with the proviso that if $R^4$ is an aliphatic aromatic or substituted aliphatic aromatic moiety the hydroxy groups are bonded only to the aliphatic portion thereof; and
   r is a positive integer having a value of from 2 up to the number of replaceable hydrogen atoms present on $R^4$.

2. The composition of claim 1 wherein said amount of said polyol is from about 0.01 to about 5 weight percent, based on the total amounts of (i)–(iii) present.

3. The composition of claim 2 wherein said minor amount of polyol is from about 0.05 to about 2 weight percent.

4. The composition of claim 1 wherein said amount of polyol is an antiyellowing effective amount.

5. The composition of claim 4 wherein said antiyellowing effective amount is at least about 0.05 weight percent.

6. The composition of claim 1 wherein $R^4$ contains from 2 to about 20 carbon atoms.

7. The composition of claim 6 wherein r has a value of from 2 to about 8.

8. The composition of claim 6 wherein $R^4$ is an acylic aliphatic hydrocarbon moiety.

9. The composition of claim 8 wherein said polyol is a hexahydric alkanol.

10. The composition of claim 9 wherein said polyol is mannitol, inositol, or mixtures thereof.

11. The composition of claim 1 wherein said polyester is poly(alkylene terephthalate).

12. The composition of claim 11 wherein said poly(alkylene terephthalate) is poly(butylene terephthalate).

13. The composition of claim 1 wherein said polyester is comprised of the reaction products of a glycol portion comprised of 1,4-cyclohexane dimethanol, ethylene glycol, or mixtures thereof; and an acid portion comprised of isophthalic acid, terephthalic acid, or mixtures thereof.

14. The composition of claim 1 wherein said copolyester-carbonate resin is comprised of the reaction products of at least one dihydric phenol, a carbonate precursor, and at least one ester precursor.

15. The composition of claim 14 wherein said ester precursor is selected from isophthalic acid or its ester forming reactive derivatives, terephthalic acid or its ester forming reactive derivatives, or mixtures thereof.

16. The composition of claim 15 wherein said carbonate precursor is phosgene.

17. The composition of claim 16 wherein said dihydric phenol is bisphenol-A.

18. The composition of claim 15 wherein said copolyester-carbonate resin has an ester content of from about 70 to about 80 mole percent.

19. The composition of claim 18 wherein said ester content is from about 1 to about 10 mole % terephthalate and from about 90 to about 99 mole % isophthalate.

20. The composition of claim 19 which contains a flame retardant amount of at least one flame retardant compound.

21. The composition of claim 20 wherein said flame retardant compound is selected from the alkali or alkaline earth metal salts of organic sulfonic acids.

22. A resinous composition comprising:
   (i) at least one aromatic copolyestercarbonate resin;
   (ii) at least one polyester resin; and
   (iii) from about 0.01 to about 5 weight percent, based on the total amounts of (i)–(iii) present of at least one polyol of the formula $$R^4-(OH)_r$$

wherein $R^4$ is selected from aliphatic hydrocarbon moieties, substituted aliphatic hydrocarbon moieties, aliphatic aromatic hydrocarbon moieties, or substituted aliphatic aromatic hydrocarbon moieties, with the proviso that if $R^4$ is an aliphatic aromatic or substituted aliphatic aromatic moiety the hydroxy groups are bonded only to the aliphatic portion thereof; and r is a positive integer of 2 to 4.

23. The composition in accordance with claim 22 wherein said polyol is from about 0.05 to about 2 weight percent.

24. The composition of claim 22 wherein said polyol is an antiyellowing effective amount.

25. The composition of claim 24 wherein the polyol is at least about 0.05 weight percent.

26. The composition of claim 25 wherein $R^4$ is from 2 to about 20 carbon atoms, inclusive.

27. The composition of claim 26 wherein $R^4$ is an acyclic aliphatic.

28. The composition of claim 26 wherein each hydroxy is attached to a different carbon atom.

29. The composition of claim 22 wherein the polyester is poly(alkylene terephthalate).

30. A resinous composition comprising:
   (i) at least one aromatic copolyestercarbonate resin;
   (ii) at least one polyester resin; and
   (iii) from about 0.01 to about 5 weight percent, based on the total amounts of (i)–(iii) present wherein the polyol is a mannitol, inositol or mixtures thereof.

31. A resinous composition comprising:
   (i) at least one aromatic copolyestercarbonate resin;
   (ii) at least one polyester resin; and
   (iii) from about 0.01 to about 5 weight percent, based on the total amounts of (i)–(iii) present of at least one polyol of the formula $$R^4(OH)_r$$

wherein $R^4$ is an acyclic aliphatic hydrocarbon, r is a positive integer of 2 to about 8 and each hydroxy is attached to a different carbon atom of the hydrocarbon.

32. The composition in accordance with claim 31 wherein the hydrocarbon has from 2 to about 20 carbon atoms, inclusive.

33. The composition in accordance with claim 31 wherein an anti-yellowing effective amount of the polyol is present.

34. The composition in accordance with claim 31 wherein the polyol is from about 0.05 weight percent.

35. The composition in accordance with claim 33 wherein the polyol is from about 0.05 weight percent.

* * * * *